(12) United States Patent
Kamada et al.

(10) Patent No.: US 8,412,027 B2
(45) Date of Patent: Apr. 2, 2013

(54) DISPLAY CONTROLLING APPARATUS FOR PLAYING BACK MOVING IMAGE AND CONTROL METHOD FOR THE SAME

(75) Inventors: Yousuke Kamada, Yokohama (JP); Akiyoshi Ishii, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 129 days.

(21) Appl. No.: 13/027,871

(22) Filed: Feb. 15, 2011

(65) Prior Publication Data
US 2011/0211802 A1 Sep. 1, 2011

(30) Foreign Application Priority Data

Feb. 26, 2010 (JP) ................. 2010-043062

(51) Int. Cl.
*H04N 9/80* (2006.01)
(52) U.S. Cl. .................................... 386/241; 386/248
(58) Field of Classification Search ............ 386/241, 386/248
See application file for complete search history.

(56) References Cited

U.S. PATENT DOCUMENTS

| 5,953,008 A | * | 9/1999 | Hagiuda ..................... 345/630 |
| 2006/0146167 A1 | * | 7/2006 | Aizawa et al. ........... 348/333.01 |

FOREIGN PATENT DOCUMENTS

JP 2008-097727 4/2008

* cited by examiner

*Primary Examiner* — Thai Tran
*Assistant Examiner* — Nigar Chowdhury
(74) *Attorney, Agent, or Firm* — Cowan, Liebowitz & Latman, P.C.

(57) ABSTRACT

Information regarding frames of a moving image, which are included in a predetermined segment that includes the current playback position and a segment that has not been played back yet, is displayed in a time-series indicator region along with the moving image that is being played back. Furthermore, a segment indicator that indicates the start position and end position of a fixed segment that includes the current playback position is displayed in the time-series indicator. For example, in the case where moving image data at a position corresponding to the segment indicator is generated as a separated moving image file in accordance with a moving image copy instruction that has been given, the user can become aware ahead of time what kind of moving image file would be generated if such an instruction were given.

14 Claims, 6 Drawing Sheets

| METADATA | BITMAP | |
|---|---|---|
| | ICON | PATTERN |
| CAMERA-SHAKE | 🖐 | ▨ |
| FACE | ☺ | ⋯ |
| ZOOM | ZOOM | ▦ |
| PAN | ↔ | ▤ |

| | FACE IMAGE |
|---|---|
| PERSON A | 😊 |
| PERSON B | 😊 |
| PERSON C | 😊 |
| PERSON D | 😊 |

DISPLAY CONTROLLING APPARATUS FOR PLAYING BACK MOVING IMAGE AND CONTROL METHOD FOR THE SAME

BACKGROUND OF THE INVENTION

1. Field of the Invention

The present invention relates to a display controlling apparatus that plays back and displays a moving image and a control method for the same, and in particular relates to a display controlling apparatus that can edit a fixed time length segment of a moving image that is being played back and a control method for the same.

2. Description of the Related Art

Conventionally, in an apparatus that plays back and displays a recorded moving image, a function for assisting a search for a scene that a user wants to be played back has been proposed. There is known to be, for example, a function in which a recorded moving image is automatically logically divided into a plurality of cuts (or clips), a representative image for each cut is displayed as a selectable thumbnail, and a playback start position can be designated by selecting one of the thumbnails.

However, this function is effective only in the case where the user can identify, based on the representative images, which of the automatically detected cuts includes the scene that the user wants to be played back. In other cases, the user needs to search for the desired playback scene by, for example, successively fast-forwarding through the automatically detected cuts.

As one example of technology for reducing the effort required in such cases, Japanese Patent Laid-Open No. 2008-97727 discloses technology in which, in the case of playing back a cut designated by the selection of a thumbnail, a distribution of information obtained when that cut was shot (attribute information) is visually displayed on a time axis along with a cursor in parallel with the moving image. Examples of the attribute information disclosed in Japanese Patent Laid-Open No. 2008-97727 include camera-shake amount, zoom operation, and focusing status at the time of shooting.

According to the playback method disclosed in Japanese Patent Laid-Open No. 2008-97727, when playback is started from the beginning of a cut, the user can be aware of the information obtained during shooting in all of the segments of that cut, thus allowing the user to quickly move the playback position to a position at which the information obtaining during shooting satisfies a specified condition.

However, in the case of searching for a scene for the purpose of cutting out or copying a scene having a preset length (time), it has not been possible to be aware of the correspondence between the segment to be cut out and the attribute information included in that segment. For example, in the case where the user wants the cut-out segment to end when a zoom-in operation has ended, it has not been possible to easily be aware of where the start point of the cut-out segment is to be set.

Also, a similar problem becomes even more significant in the case where the user wants to designate a cut-out segment while taking information that is not included in the attribute information into consideration. For example, assuming that information regarding the orientation of the subject is not included in the attribute information, in the case where the user wants to designate the end of the cut-out segment to be the video scene in which the subject has turned so as to face forward, it is not easy to determine the start point of the cut-out segment.

SUMMARY OF THE INVENTION

The present invention has been achieved in light of such problems in conventional technology. The present invention provides a display controlling apparatus that enables a segment having a preset length to be flexibly designated in a moving image that is being played back.

According to one aspect of the present invention, there is provided a display controlling apparatus comprising: a playback unit configured to play back a moving image; a display control unit configured to display a time-series indicator and a segment indicator in synchronization with playback of the moving image performed by the playback unit, the time-series indicator displaying information regarding a plurality of frames of the moving image being played back by the playback unit that are included in a first segment that includes a current playback position, the information being arranged in chronological order with respect to the moving image, and the segment indicator displaying, at respective positions in the time-series indicator, a start position and an end position of a second segment that has a fixed time length, is included in the first segment, is shorter than the first segment, and furthermore includes the current playback position; and a processing unit configured to, upon receipt of an instruction from a user during display performed by the display control unit, specify a position of the second segment in the moving image based on the time at which the instruction was received, and execute predetermined processing on data of the moving image included in the second segment at the specified position.

According to another aspect of the present invention, there is provided a control method for a display controlling apparatus comprising the steps of: playing back a moving image; displaying a time-series indicator and a segment indicator in synchronization with playback of the moving image performed in the playback step, the time-series indicator displaying information regarding a plurality of frames of the moving image being played back in the playback step that are included in a first segment that includes a current playback position, the information being arranged in chronological order with respect to the moving image, and the segment indicator displaying, at respective positions in the time-series indicator, a start position and an end position of a second segment that has a fixed time length, is included in the first segment, is shorter than the first segment, and furthermore includes the current playback position; and specifying, upon receipt of an instruction from a user during display performed in the display control step, a position of the second segment in the moving image based on the time at which the instruction was received, and executing predetermined processing on data of the moving image included in the second segment at the specified position.

Further features of the present invention will become apparent from the following description of exemplary embodiments with reference to the attached drawings.

DESCRIPTION OF THE EMBODIMENTS

Exemplary embodiments of the present invention will now be described in detail in accordance with the accompanying drawings.

Embodiment 1

Figure 1:
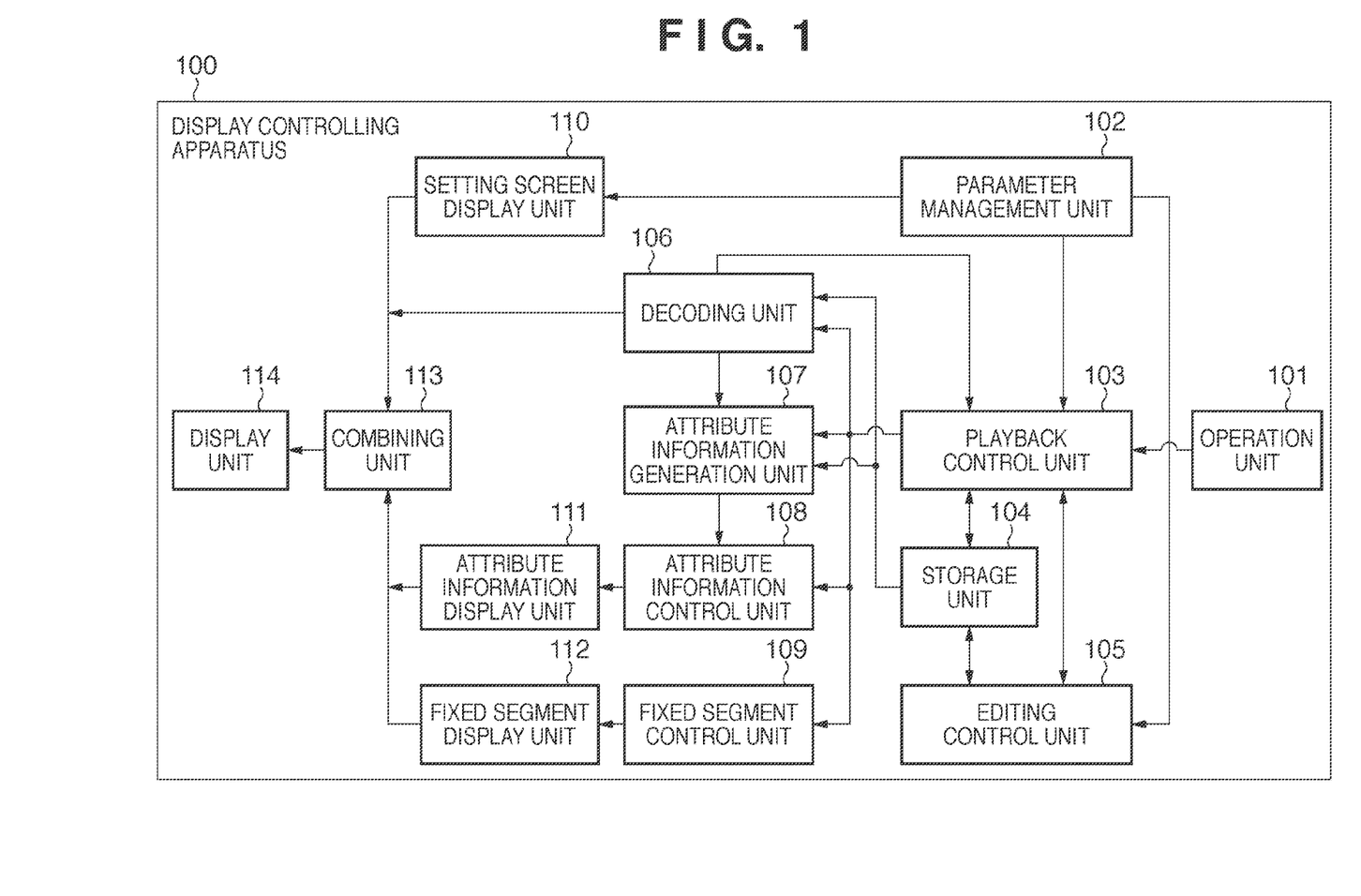
FIG. 1 is a block diagram showing an example of a functional configuration of a display controlling apparatus according to an embodiment of the present invention.

FIG. 1 is a block diagram showing an example of a functional configuration of a display controlling apparatus according to an embodiment of the present invention. The display controlling apparatus of the present invention has a function in which, upon receiving an instruction to start copying during the playback (display) of a moving image, a segment starting at the playback position at the time when the instruction was received and ending after a fixed time is copied and stored as a separate cut while the playback of the moving image is continued. This function is also called a "video snap function".

In a display controlling apparatus 100, an operation unit 101 has an input device including keys, buttons, a touch panel, or the like, and the operation unit 101 receives input from a user. The operation unit 101 also includes a remote control transmitter and receiver. A parameter management unit 102 manages parameters such as the length of a fixed segment to be copied from a moving image. A playback control unit 103 controls operations related to the playback of a moving image in the display controlling apparatus 100. Specifically, if a playback instruction has been input via the operation unit 101, the playback control unit 103 instructs a decoding unit 106, an attribute information generation unit 107, an attribute information control unit 108, and a fixed segment control unit 109 to start playback processing. Furthermore, if a copy instruction has been input via the operation unit 101 during the playback (display) of a moving image, the playback control unit 103 transmits, to an editing control unit 105, a parameter specifying the start point and the end point of the fixed segment that is to be copied, as well as an instruction to start editing.

A storage unit 104 stores a moving image and moving image management information. The storage unit 104 may be a removable storage apparatus such as a memory card, or may be a storage apparatus that is built into the display controlling apparatus, such as a hard disk drive.

The editing control unit 105 executes editing processing such as copying with use of a parameter sent from the playback control unit 103, on the moving image stored in the storage unit 104. In accordance with the instruction from the playback control unit 103, the decoding unit 106 reads out and decodes the moving image stored in the storage unit 104, and outputs moving image display data for display by a display unit 114, to the attribute information generation unit 107 and a combining unit 113. The decoding unit 106 also successively notifies the playback control unit 103 of information indicating the position in the moving image data at which decoding has ended (e.g., a frame number or information indicating elapsed time since the beginning of the moving image).

The attribute information generation unit 107 analyzes the moving image that has been decoded by the decoding unit 106 and management information (stored in the storage unit 104) regarding the decoded moving image, and generates attribute information. The attribute information generation unit 107 supplies the generated attribute information to the attribute information control unit 108.

The attribute information control unit 108 determines a display image to be used for visually expressing attribute information with use of the attribute information from the attribute information generation unit 107, for example. The fixed segment control unit 109 controls the size and display position of a display expressing a fixed segment in accordance with an instruction from the playback control unit 103.

A setting screen display unit 110 generates display data for various types of setting screens, which include a fixed segment length setting screen, in accordance with an instruction from the parameter management unit 102. An attribute information display unit 111 generates time-series indicator data for displaying a time-series indicator of change over time in attribute information in accordance with an instruction from the attribute information control unit 108. A fixed segment display unit 112 generates segment indicator data for indicating a fixed segment in the time-series indicator of attribute information in accordance with an instruction from the fixed segment control unit 109.

The combining unit 113 combines display data from the setting screen display unit 110, the decoding unit 106, the attribute information display unit 111, and the fixed segment display unit 112, and thus generates display screen data. The combining unit 113 then outputs the generated display screen data to the display unit 114. A moving image and other information are thus displayed by the display unit 114.

Note that in FIG. 1, one or more of the blocks excluding the operation unit 101, the storage unit 104, and the display unit 114 can be implemented by hardware, software, or a combination thereof. Also, a plurality of the blocks in FIG. 1 may be realized by the execution of programs by the same CPU.

Figure 2A:
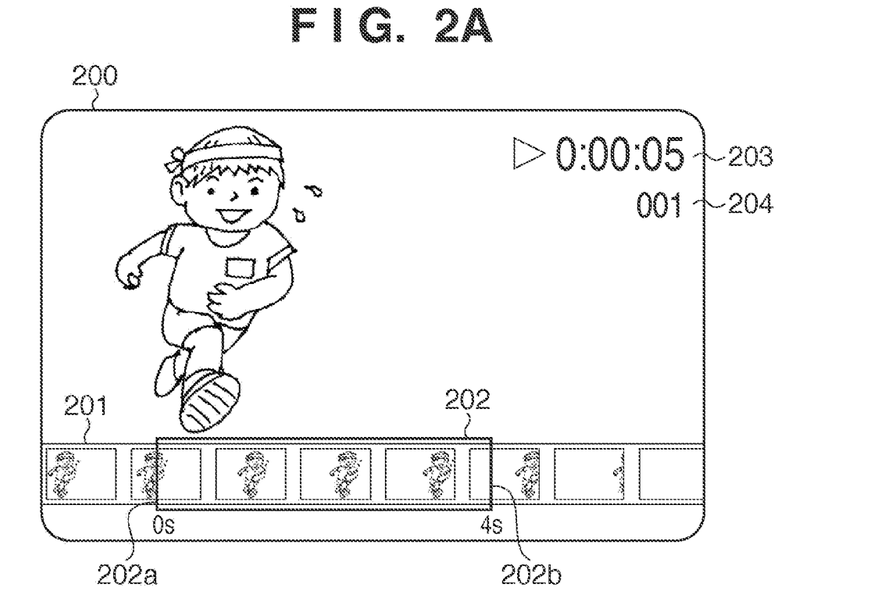
FIGS. 2A and 2B are diagrams showing examples of screens displayed during the playback of a moving image (playback screens) in the display controlling apparatus according to the embodiment of the present invention.

FIG. 2A shows an example of a screen (playback screen) displayed by the display unit 114 during the playback of a moving image in the display controlling apparatus 100.

Provided at the bottom of a playback screen 200 in FIG. 2A is a time-series indicator region 201 for displaying a time-series indicator of change over time in attribute information of the moving image that is being played back (frame images (still images) that have been extracted from the moving image). In the example in FIG. 2A, change over time in the frame images (still images) extracted from the moving image being played back is displayed along a time series in the time-series indicator region 201.

Note that the time-series indicator region 201 displays change over time in the attribute information that is in a segment (first segment) that is a continuous segment including at least the current playback position and a segment that has not yet been played back, and that is longer than the fixed segment (second segment) on which copy processing is to be performed. The first segment may be the entirety of the moving image. If the time period for which change over time in the moving image is displayed at a single time in the time-series indicator region 201 (eight seconds in the example in FIG. 2A) is shorter than the length of the moving image or the cut that is being played back, the display in the time-series indicator region 201 is sequentially updated as the moving image is played back, thus realizing later-described scrolling display.

Also, in a frame-shaped segment indicator 202 that is displayed superimposed on the time-series indicator region 201, the current playback position is indicated by a left edge 202a of the segment indicator 202, and the playback position after the elapse of the fixed segment length is indicated by a right edge 202b. In other words, based on the display of the time-series indicator region 201 and the segment indicator 202, it is possible to be aware of an overview of the cut that would be generated if a copy instruction were given at the current time.

If frame images are displayed in the time-series indicator region 201 as in the example in FIG. 2A, it is possible to be aware of the general flow of the video that would be included in the cut that would be generated if a copy instruction were given at the current time.

In the example in FIG. 2A, an elapsed time 203, which indicates the time that has elapsed from the playback start position, and a cut number 204 of the moving image currently being played back are furthermore displayed in the playback screen as attribute information. The cut number 204 indicates which number cut the currently played back cut is among the plurality of cuts that constitute the moving image stored in the storage unit 104.

Display data for the attribute information displayed in FIG. 2A is generated by the attribute information display unit 111 under control of the attribute information control unit 108.

In the present embodiment, the fixed segment length with respect to copy processing can be set by the user with use of a segment length setting screen that the setting screen display unit 110 causes the display unit 114 to display via the combining unit 113.

Figure 3A:
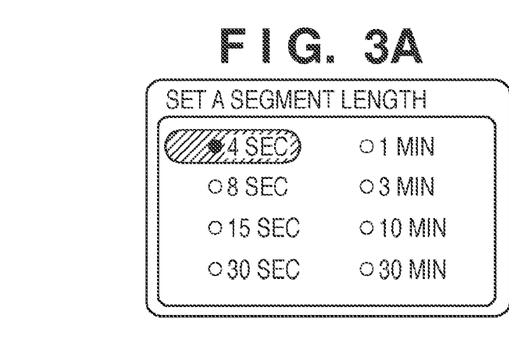
FIGS. 3A and 3B are diagrams showing examples of segment length setting screens in the display controlling apparatus according to the embodiment of the present invention.
Figure 3B:
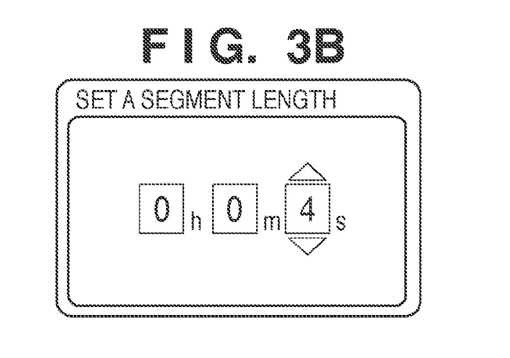

FIGS. 3A and 3B show examples of the segment length setting screen. FIG. 3A shows an example of a setting screen in which a selection is made from among predetermined segment lengths, and FIG. 3B shows an example of a setting screen in which the segment length can be set to an arbitrary value. An hour value, a minute value, and a second value can be set in the setting screen shown in FIG. 3B. Setting operations performed via the setting screen can be performed by operating direction keys, an enter key, a mouse, a keyboard or the like included in the operation unit 101. Besides the screens shown in FIGS. 3A and 3B, the segment length can be set with use of various known GUIs and operation methods. The segment length that has been set with use of the operation unit 101 via the segment length setting screen is stored in the parameter management unit 102 via the playback control unit 103. The segment length may be stored by the playback control unit 103 as well.

Figure 4:
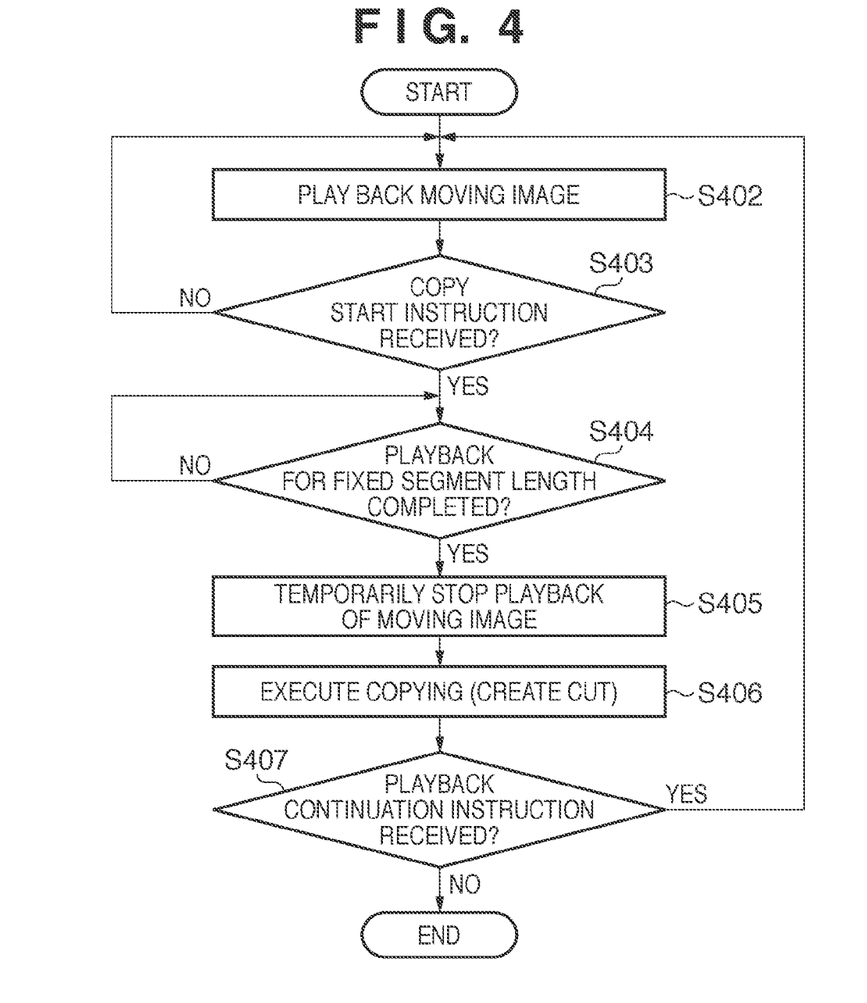
FIG. 4 is a flowchart for illustrating moving image playback processing performed by the display controlling apparatus according to the embodiment of the present invention.

Next is a description of moving image playback processing performed by the display controlling apparatus 100 of the present embodiment with reference to the flowchart in FIG. 4.

Upon the user instructing the playback of a moving image stored in the storage unit 104 with use of the operation unit 101, the playback of the moving image is started (S402). Upon receiving the instruction to playback the moving image, the playback control unit 103 gives the decoding unit 106 a decode instruction and information specifying data of the moving image whose playback has been instructed. Note that the moving image may be played back from the beginning, and it is possible for the display unit 114 to display thumbnails of a plurality of cuts constituting the moving image (the cuts may have been automatically detected, or designated by the user), and for playback to begin at the position corresponding to a thumbnail selected by the user. In the latter case, the playback control unit 103 also notifies the decoding unit 106 of playback start position information (arbitrary information that enables specifying a position in the moving image, such as a frame number or a time since the beginning of the moving image). Note that the playback start position information corresponding to the individual thumbnails is assumed to be stored in advance in the storage unit 104 in association with the moving image data. The decoding unit 106 reads the moving image data from the storage unit 104, decodes the moving image data in accordance with the encoding format of the data, and outputs the decoded moving image data to the attribute information generation unit 107 and the combining unit 113.

Furthermore, the playback control unit 103 instructs the attribute information generation unit 107 to generate frame images based on the moving image data supplied from the decoding unit 106. The attribute information generation unit 107 generates still images of frames in the moving image data as the frame images, and sequentially supplies the generated frame images to the attribute information control unit 108. Note that if the resolution of the moving image data is higher than the resolution of the display unit 114, the attribute information generation unit 107 generates reduced frame images in conformity with the resolution of the display unit 114. Hereinafter, the concept of a "frame image" is assumed to included a reduced frame image. The attribute information generation unit 107 also generates image data for the information expressing other information (cut number and the like), elapsed time, and the like related to the moving image that is being played back, and supplies such image data to the attribute information control unit 108.

Based on the current playback position and information indicating a frame image display interval (e.g., one image per second) that have been received from the playback control unit 103, the attribute information control unit 108 selects only frame images that are necessary for display in the time-series indicator region 201. The attribute information control unit 108 then supplies the selected frame images to the attribute information display unit 111.

The attribute information display unit 111 generates display screen data in which the received frame images are mapped to the time-series indicator region 201 in the display screen, and supplies the generated display screen data to the combining unit 113.

Furthermore, the playback control unit 103 notifies the fixed segment control unit 109 of the current playback position information and the frame image display interval information that have been notified by the decoding unit 106, and gives a segment indicator display instruction. Based on the received information, the fixed segment control unit 109 notifies the fixed segment display unit 112 of information indicating the size of the segment indicator 202 (in particular, the length in the direction of the time axis of the time-series indicator region 201) and the display position of the segment indicator 202. Based on the received information, the fixed segment display unit 112 generates display screen data for the segment indicator 202, maps such display screen data to the display screen, and supplies the resulting display screen data to the combining unit 113.

Note that in the case where frame images are to be displayed in the time-series indicator region 201 by scrolling display in accordance with the advance of time, the display position of the segment indicator 202 is to be fixed. In this case, the attribute information display unit 111 creates and updates the display screen data for the frame images such that the display position of the segment indicator 202 and the scrolling display of the frame images are in synchronization with each other. Specifically, in the case where, for example, the frame image display interval is one image per second, and the segment length is four seconds, the attribute information display unit 111 sets the frame image scroll speed such that one frame image passes either edge (202a or 202b in FIG. 2A) of the segment indicator 202 each second. Also, if a margin is displayed between adjacent frame images, the scroll speed is set based on the assumption that the center of the margin in the width direction is the left edge and right edge of respective frame images.

In order for the display screen data supplied from the decoding unit 106, the attribute information display unit 111, and the fixed segment display unit 112 to be displayed at the same time, the combining unit 113 combines such display screen data, thus generating one screen-worth of display screen data (combined screen data). The combining unit 113 then supplies the generated display screen data to the display unit 114.

According to the operations described above, when the playback of the moving image starts, the display unit 114 displays a screen such as that shown in FIG. 2A.

Note that the combining unit 113 generates the combined screen data by combining the display screen data from the decoding unit 106, the display screen data from the attribute information display unit 111, and the display screen data from the fixed segment display unit 112 in the stated order from the background to the foreground.

During the playback of the moving image, if the user has given an instruction to start copying (S403) by, for example, pressing a button of the operation unit 101, the playback control unit 103 stores the playback position information at that point in time. The playback control unit 103 then continues the playback from the playback position corresponding to the copy start instruction until a time corresponding to the set segment length has elapsed (S404), and then temporarily stops (pauses) the playback (S405). The playback control unit 103 also stores the playback position information at the point in time when the playback was temporarily stopped. Note that in the present embodiment, when a copy start instruction has been received, even if a new copy start instruction has been given via the operation unit 101 before the copy processing has ended, the playback control unit 103 does not accept the new copy start instruction. Also, the playback control unit 103 accepts a copy start instruction only during normal playback of a moving image, and does not accept a copy start instruction in a non-playback state (e.g., a stopped state or temporarily stopped state) or during special playback (e.g., fast forward/fast rewind, slow playback/slow reverse playback, or frame advance/frame rewind). Also, the playback control unit 103 does not accept a copy start instruction even during normal playback if the playback of the moving image itself is difficult, the free space of the copy storage destination (here, the storage unit 104) has been determined to be insufficient, or the upper limit of the number of cuts that can be generated from a single moving image has been reached. Furthermore, in the case where a copy operation spanning a plurality of cuts is prohibited, the playback control unit 103 does not accept a copy start instruction if, for example, the total time of a cut is less than one second, or the copy start position is less than one second after the end edge of a cut.

Moreover, although the playback position information at the time when the playback was temporarily stopped has been assumed to be stored as the information indicating the end position (end point) of the segment to be copied, there is no limitation to this, and it is possible to specify and store an end position that is before the position at which the playback was temporarily stopped. In other words, it is possible to store information indicating an end position that is before the position at which the playback was temporarily stopped by specifying the start position of the segment that is to be copied in accordance with the receipt of the copy start instruction (the playback position at the time when the copy start instruction was received), and then specifying the end position based on the start position. The end position can be specified as a position subsequent to the playback position at the time of receipt of the copy start instruction by a time corresponding to the segment length, and alternatively, if the remaining time of the cut in the copy-source moving image is shorter than the segment length, the end position can be specified as the end edge of the cut of the copy-source moving image. In any case, the segment that is to be copied is specified based on the time at which the copy start instruction was received from the user. In other words, a copy start instruction from the user is an instruction for specifying a segment that is to be copied. Note that due to a time lag in processing, the start position of the segment that is to be copied is not strictly limited to the playback position at the time when the copy start instruction was received from the user, but rather is determined as being at least in conjunction with the time at which the copy start instruction was received from the user.

Upon temporarily stopping the playback, the playback control unit 103 notifies the editing control unit 105 of the playback position information indicating the time (start point) when the copy segment start point instruction was received and the time (end point) when the playback was temporarily stopped, and information indicating a cut number and the like, and gives an instruction to execute copying. The editing control unit 105 copies the moving image from the start point to the end point with use of the data of the moving image being played back that is stored in the storage unit 104, and stores the copied data as a new cut in the storage unit 104 (S406). Note that no modifications are made to the copy-source data in the copy processing. When the execution of copying (cut creation) has been completed, the editing control unit 105 notifies the playback control unit 103 of the end of the execution of copying. The playback control unit 103 inquires whether the playback of the moving image is to be continued (S407) by causing the display unit 114 to display a dialog such as "Continue playback?" via the parameter management unit 102 and the setting screen display unit 110. If the user has instructed the continuation of playback via the operation unit 101 in response to the inquiry, the playback control unit 103 resumes the playback of the moving image from where the playback was temporarily stopped in S405. On the other hand, if an instruction to not continue the playback has been given in S407, the playback control unit 103 ends the playback processing.

Next is a description of display control in the case where frame images of the moving image are displayed as attribute information in the playback screen 200 shown in FIG. 2A.

In the example in FIG. 2A, the display interval of the frame images displayed in the time-series indicator region 201 is one second, and therefore one image expresses one second of the moving image. Also, all of the frame images can be displayed as eight images aligned horizontally (along the time series) in the time-series indicator region 201. In order for the position of the left edge 202*a* of the segment indicator 202 to express the current playback position, the frame images are displayed so as to scroll from the right edge of the playback screen 200 to the left edge in synchronization with the moving image that is being played back. Here, since the segment length is set to four seconds, display is performed such that the frame image corresponding to the right edge 202*b* of the segment indicator 202 is the frame image that is the fourth image after the frame image corresponding to the left edge 202*a*.

Figure 5A:
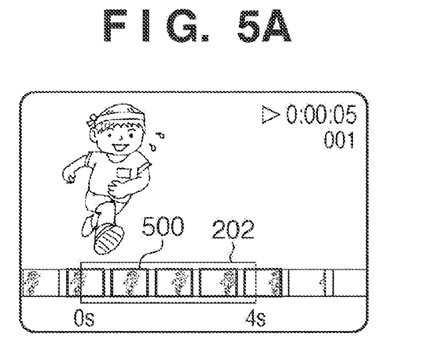
FIGS. 5A to 5C are diagrams showing examples of screens displayed during the playback of a moving image (playback screens) in the display controlling apparatus according to the embodiment of the present invention.
Figure 5B:
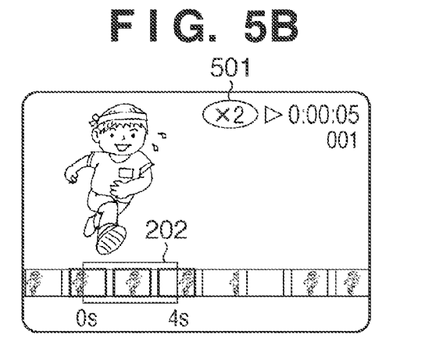

Note that even in the case where playback is temporarily stopped, or the case of special playback such as fast forward, fast rewind, slow playback, or slow reverse playback, the moving image that is being played back and the display of the time-series indicator region 201 are synchronized by changing the scrolling direction and/or speed of the frame images. In such a case, the playback control unit 103 notifies the attribute information control unit 108 and the fixed segment control unit 109 of information regarding the content of an instruction from the operation unit 101 (e.g., playback direction and speed). In order to create display screen data in accordance with the notified content, the attribute information control unit 108 and the fixed segment control unit 109 control the attribute information display unit 111 and the fixed segment display unit 112 respectively. It is also assumed that the segment indicator 202 is displayed at all times regardless of the type of operation that is performed during playback, and that the display position thereof is fixed at all times. Also, the fixed segment control unit 109 determines the width of the segment indicator 202 in accordance with the segment length set in the segment length setting screens shown in FIGS. 3A and 3B, the size of the frame images (number of pixels in the horizontal direction of the screen, which is the time axis), and the display interval. FIG. 5B shows an example in which the width of the segment indicator 202 during double speed playback (shown by an indicator 501) is, for example, half that in the case of normal playback as shown in FIG. 5A. Since the playback speed in FIG. 5B is double that in FIG. 5A, the moving image that is being played back and the display of the time-series indicator region 201 are synchronized by reducing the frame image display interval by half (one image every two seconds) and setting the scrolling speed to the same as that in FIG. 5A. Although the width of the segment indicator 202 is half that in FIG. 5A, the time period enclosed therein is four seconds, which is the same as in FIG. 5A.

Although the frame images displayed in the time-series indicator region 201 in FIG. 2A are displayed at the interval of one image for each second of the moving image, the display interval may be changed in a setting screen or the like. For example, it is possible to allow the user to designate a frame image display interval from among predetermined options or set an arbitrary value in setting screens that are similar to the segment length setting screens shown in FIGS. 3A and 3B. When the display interval is set, if the frame image display interval is longer than the segment length that is already set, a warning such as "The set display interval is too long" may be given, or the selection or setting of a display interval value that is exceedingly large may be disabled.

Also, although the example in which the total number of frame images displayed in the time-series indicator region 201 is eight has been given, it is possible to, likewise to the above-described case, allow the user to select a total display number from among pre-provided options such as 8, 16, and 24 images, or designate an arbitrary number of images. Moreover, instead of designating a number of images, it is possible to allow the user to set the time span of the display in the time-series indicator region 201. In this case as well, it is possible to allow the user to select a time span from among pre-provided options such as 8, 16, and 24 seconds, or designate an arbitrary time span. In the case of enabling the time span to be set, if the designated time span is shorter than the segment length that is already set, a warning such as "The set time span is too short" may be made, or such a selection or setting may be disabled.

Also, although the example in which the segment indicator 202 is displayed at all times regardless of the type of operation performed during playback has been given, in the present embodiment, a copy start instruction is not accepted while playback is temporarily stopped or during special playback as described above. For this reason, it is possible to cause the segment indicator 202 to not be displayed in a state in which a copy start instruction is not accepted. Doing this enables the user to be aware of whether a copy start instruction can be given based on whether the segment indicator 202 is displayed. Note that although the example in which a copy start instruction is not accepted while playback is temporarily stopped or during special playback has been given, a copy start instruction may be accepted in such cases. Displaying a screen such as the above-described screen in FIG. 5B enables the user to check, based on the segment indicator 202, which scenes (images) are included in a segment that is to be copied even in the case of special playback.

Also, although the example in which the display position of the segment indicator 202 is fixed at all times has been given, it is possible to allow the user to select at which position (e.g., "left edge" or "center") the segment indicator 202 is displayed, as with the segment length setting screens shown in FIGS. 3A and 3B. Moreover, if the display unit 114 includes a touch panel, it is possible to enable the segment indicator 202 to be directly moved to the left/right. A warning may be displayed if the segment indicator 202 is moved such that a cut cannot be created.

Also, although the frame image display mode in the time-series indicator region 201 does not change regardless of the positional relationship with the segment indicator 202 in the example in FIG. 2A, it is possible to display only the frame images that at least partially overlap with the frame of the segment indicator 202 in an emphasized manner such as shown in FIG. 5A. It is also possible to change the color of only the frame images that at least partially overlap with the frame of the segment indicator 202, or change the size thereof.

Also, the example has been given in which the width of the segment indicator 202 in the playback screen 200 shown in FIG. 2A is increased/decreased in accordance with the segment length set in the segment length setting screens shown in FIGS. 3A and 3B. However, if the display unit 114 includes a touch panel, it is possible to allow the user to increase/decrease the width of the segment indicator 202 by directly performing an operation on the segment indicator 202 in the playback screen 200.

Also, the example has been given in which in the playback screen 200 shown in FIG. 2A, the display position of the segment indicator 202 is fixed, and the frame images are displayed so as to scroll from the right edge of the playback screen 200 toward the left edge. However, it is possible to display the frame images at fixed positions and display the segment indicator 202 in a scrolling manner. In this case, since the frame images are displayed at fixed positions, the frame image display interval is determined in accordance with the overall length of the moving image or cut that is being played back, and the number of frame images to be displayed in the time-series indicator region 201. In this case, the display position of the segment indicator 202 is updated along with the playback of the moving image, such that the left edge 202a of the segment indicator 202 indicates the current playback position.

Figure 5C:
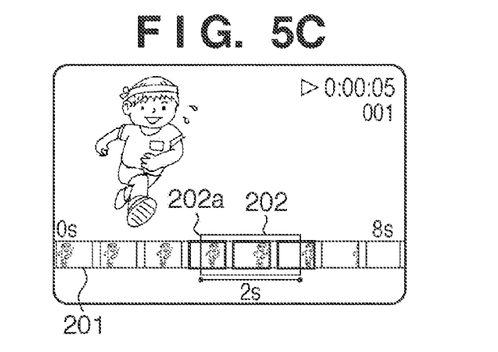

FIG. 5C shows an example of the case where the fixed length is two seconds, the length of the cut to be played back is eight seconds, and a maximum of eight frame images can be displayed in the time-series indicator region 201. In this case, the frame image display interval is one second. Also, the segment indicator 202 is displayed so as to scroll from the left edge to the right edge in synchronization with the video that is being played back. In this case, the left edge of the time-series indicator region 201 indicates the start position (0s) of the cut, and the right edge indicates the end position (8s).

In this way, the display controlling apparatus of the present embodiment enables a copy of a segment having a predetermined fixed length in a moving image to be generated starting at a start position that has been designated during the playback of the moving image. Also, during the playback of the moving image, a time-series indicator displaying frame images of the moving image that is being played back, and a segment indicator indicating a fixed-length segment starting at the current playback position on the time-series indicator are displayed in synchronization with the playback of the moving image. This enables a copy start instruction to be given after having confirmed what kind of images are included in the fixed-length segment.

Embodiment 2

Next is a description of Embodiment 2 of the present invention with emphasis on differences from Embodiment 1. A feature of the present embodiment is that the segment indicator is displayed with use of metadata that was added when the moving image was recorded.

Processing up to the start of playback of the moving image is the same as that in Embodiment 1. When the playback is started, the playback control unit 103 instructs the attribute information generation unit 107 to extract metadata that is in correspondence with time information from the moving image data decoded by the decoding unit 106 or the moving image management information in the storage unit 104. The following are examples of metadata that is in correspondence with time information. Examples include information indicating whether camera-shake occurred during shooting, whether a face was detected during shooting, whether a zoom operation was performed during shooting, whether a panning operation was performed during shooting, whether audio was recorded, whether a back-lit state existed, whether a low/high contrast state existed, and whether an unawarely-captured state existed. The metadata is assumed to be recorded along with the moving image as attribute information of the moving image, and the types of the states expressed by the metadata and the times at which (or periods in which) the states were detected are assumed to be in association with each other.

The attribute information generation unit 107 supplies the metadata extracted from the moving image data or management information to the attribute information control unit 108.

The attribute information control unit 108 associates the values of the received metadata and display bitmap data that has been provided in advance. The attribute information control unit 108 also compares the current playback position received from the playback control unit 103 and the time information of each piece of metadata, and sends bitmap data for metadata that is necessary for display to the attribute information display unit 111.

The attribute information display unit 111 generates display screen data in which the received bitmap data is mapped to the display screen, and supplies the generated display screen data to the combining unit 113. Also, the playback control unit 103 transmits, to the fixed segment control unit 109, information indicating the current playback position and the segment length, as well as gives an instruction to display the segment indicator. The fixed segment control unit 109 determines the size and display position of the segment indicator based on the received information, and notifies the fixed segment display unit 112 of the determined information. Based on the received information, the fixed segment display unit 112 generates display screen data for the segment indicator, maps such display screen data to the display screen, and supplies the resulting display screen data to the combining unit 113.

The combining unit 113 combines the display screen data supplied from the decoding unit 106, the attribute information display unit 111, and the fixed segment display unit 112, thus generating one screen-worth of display screen data (combined screen data). The combining unit 113 then supplies the generated display screen data to the display unit 114.

It is sufficient for the processing performed after a copy start instruction has been received during the playback of a moving image to be similar to the processing described in steps S404 to S407 in Embodiment 1, and thus a description thereof has been omitted.

Figure 6A:
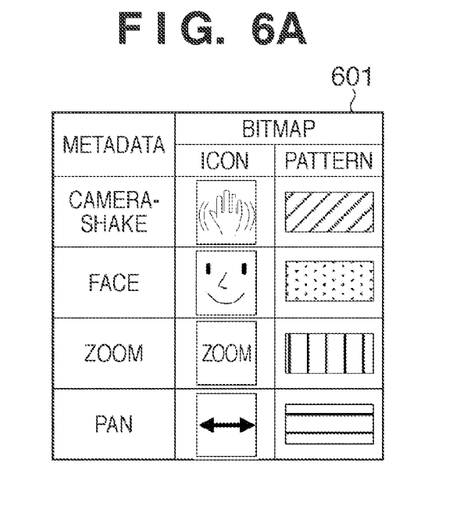
FIGS. 6A and 6B are diagrams respectively showing examples of a metadata management table and a face data management table that are used in a display controlling apparatus according to Embodiment 2 of the present invention.

FIG. 6A shows an example of a metadata management table 601 used by the attribute information control unit 108 in order to associate the metadata from the attribute information generation unit 107 with bitmap data. For example, if the metadata includes a "camera-shake" metadata piece, the attribute information control unit 108 supplies a corresponding icon image and pattern image to the attribute information display unit 111 along with the time information included in the "camera-shake" metadata piece.

Figure 6B:
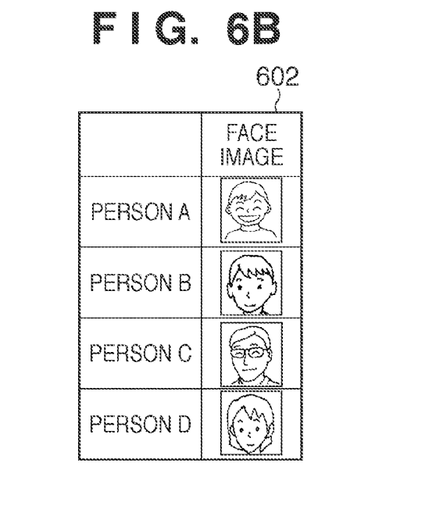

FIG. 6B shows an example of a face data management table 602, in which face data that has been registered in advance is managed. The attribute information generation unit 107 analyzes the place where a face appears based on the moving image data received from the decoding unit, and determines whether there is a match with the pattern of a face image that has been registered in advance. If a face image having a matching pattern exists, the attribute information control unit 108 supplies the bitmap data of a face image icon that is registered in the face data management table 602 to the attribute information display unit 111 instead of supplying the face icon image shown in the metadata management table 601. It is sufficient for the bitmap data of a face image icon to be, for example, a reduced image of a face image that has been registered. Note that in this case, since facial recognition is performed based on the decoded moving image data, a face image icon cannot be displayed for a segment that has not been played back yet. In this case, it is possible to display the face icon shown in FIG. 6A in a segment that has not been played back yet, and then replace (update) the face icon with a face image icon when the face has been identified.

Although the face data table has been registered in advance in FIG. 6B, it is possible to generate face images for all faces that are recognized when the attribute information generation unit 107 analyzes the moving image data, and automatically register the generated face images in the face data management table 602. Accordingly, even if a cut in which an unregistered face appears is played back, a face image icon is automatically generated and displayed during playback.

Figure 7A:
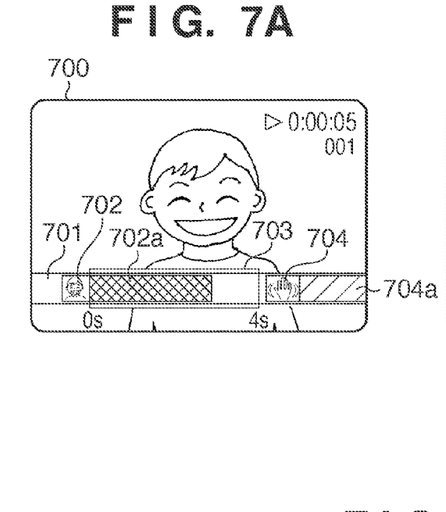
FIGS. 7A and 7B are diagrams showing examples of screens displayed during the playback of a moving image (playback screens) in the display controlling apparatus according to Embodiment 2 of the present invention.
Figure 7B:
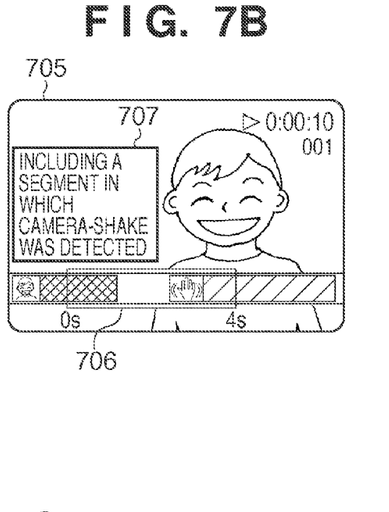

Next is a description of display control performed in the case of displaying metadata of a moving image as attribute information in playback screens 700 and 705 shown in FIGS. 7A and 7B respectively.

In a time-series indicator region 701 shown in FIG. 7A, icon images and band-like pattern images in the metadata management table 601 are displayed in segments that include metadata targeted for display. Here, the icon images are displayed in the foreground with respect to the band-like pattern images. The band-like pattern images indicate segments that include metadata, and in one example, the pattern image corresponding to a face 702 metadata piece indicates a segment from when a face appears until when the face is no longer recognized. As for the "camera-shake" metadata piece, a band-like pattern image 702a indicates a segment from when camera-shake is detected until when camera-shake is no longer detected. The displayable time span of the time-series indicator region 701 is eight seconds. Also, similarly to Embodiment 1, the left edge of a segment indicator 703 is assumed to be the current playback position, and the icon images and pattern images corresponding to the metadata are displayed so as to scroll from the right edge of the playback screen 700 to the left edge in synchronization with the moving image that is being played back. Even in the case where playback is temporarily stopped, or the case of special playback, the moving image that is being played back and the display of the time-series indicator region are synchronized by changing the scrolling speed of the bitmap images corresponding to the metadata. It is also assumed that the segment indicator 703 is displayed at all times regardless of the type of operation that is performed during playback, and that the display position thereof is fixed at all times. Also, the width of the displayed segment indicator 703 is increased/decreased in accordance with the segment length set in the segment length setting screens shown in FIGS. 3A and 3B.

In a time-series indicator region 706 shown in FIG. 7B, a warning display 707 that indicates "Including a segment in which camera-shake was detected" is displayed via the setting screen display unit 110 if the icon image or pattern image corresponding to "camera-shake" is included in the segment indicator 703. A warning can be displayed in a similar manner for a segment that includes metadata indicating a state that can be considered to have little need to be included in the cut, such as "back-lit", "unawarely-captured", or "low contrast".

Note that in the present embodiment, a description has been given in which both an icon image and a pattern image are managed for each type of metadata in the metadata management table 601, and a combination of a pattern image and an icon image is displayed in a segment that includes metadata. However, it is also possible to display only an icon image or only a pattern image. Also, the pattern image may be a character string. Furthermore, the present embodiment and Embodiment 1 described above can be combined. As one example, the pattern images described in Embodiment 2 are displayed in the blank portions corresponding to the background of the frame images in the time-series indicator region 201 shown in FIG. 2A in Embodiment 1. In this case, an icon image is displayed so as to overlap with the leading frame image in the period including the metadata indicated by the icon image, or displayed at a different position than that of the frame image, such as the position corresponding to the start position of the period including the metadata indicated by the icon image.

As described above, in the present embodiment, states of the moving image indicated by metadata recorded in the moving image are displayed as attribute information of the moving image in the time-series indicator, instead of frame images as described in Embodiment 1. For this reason, combining such attribute information and the segment indicator has the effect of facilitating the designation of a copy start position such that, for example, a face is included in the copy segment or a shaky segment is not included.

Other Embodiments

In Embodiments 1 and 2, a description is given in which upon receipt of an instruction during the playback of a moving image, a new cut is generated by copying a fixed length segment from the playback position corresponding to the received instruction. However, the present invention is to facilitate the designation of the start position of a fixed segment, and how the designated fixed segment is used is arbitrary. For example, processing for changing the data itself of the moving image that is being played back may be performed, such as deleting the designated fixed segment or performing division.

Furthermore, although the left edge of the segment indicator 202 is assumed to be the current playback position in the embodiments described above, there is no limitation to this, and the segment indicated by the segment indicator 202 at the time when the copy start instruction is received needs only be displayed so as to indicate the segment that is to be copied. For example, a configuration is possible in which the segment indicator 202 is displayed such that the right edge of the segment indicator 202 is the current playback position, and upon receiving a copy start instruction, the segment that is copied starts at a position prior to the playback position at the time of instruction receipt by the segment length indicated by the segment indicator 202 and ends at the playback position at the time of instruction receipt. This configuration also exhibits an effect of the present invention, namely that a copy start instruction is given after having confirmed, based on the segment indicator 202, what kind of scenes (images) will be included in the segment that is to be copied. Also, a configuration is possible in which display is performed such that the current playback position is a specified position enclosed within the segment indicator 202, one example of which is, letting the segment length be n seconds, a position that is m seconds from the left edge of the segment indicator 202 and n-m seconds from the right edge of the segment indicator 202. In this case, the current playback position cannot be identified based on only the segment indicator 202, and therefore display can be performed so as to explicitly indicate the current playback position. In this case, it is assumed that upon receiving a copy start instruction, the segment that is copied starts at a position that is m seconds prior to the playback position at the time of the instruction receipt and ends at a position that is n-m seconds subsequent to the playback position at the time of the instruction receipt.

Figure 8:
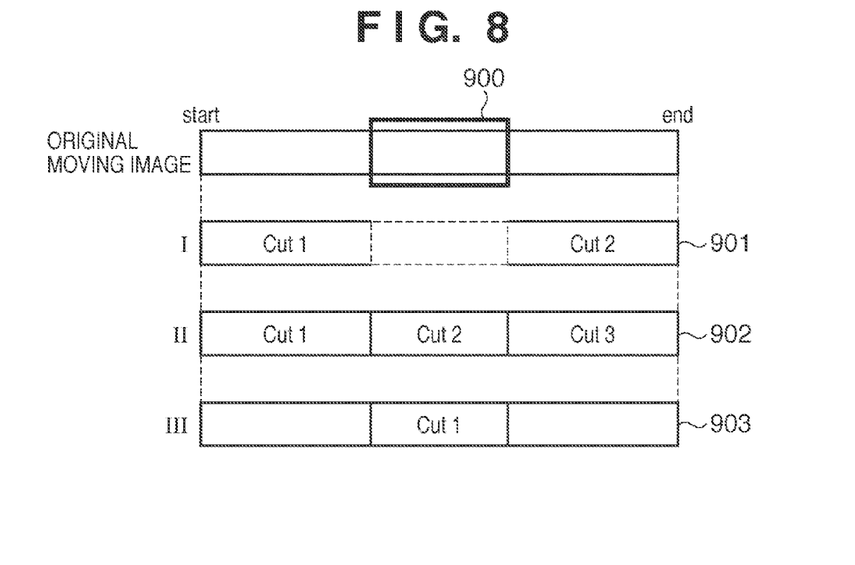
FIG. 8 is a flowchart for illustrating an example of operations in deletion or division processing in a display controlling apparatus according to an embodiment of the present invention.

Operations performed in the case of deleting or dividing are described below with reference FIG. 8. Assume that the range of a fixed segment 900 has been designated in an original moving image. In the case where the fixed segment 900 has been deleted, as shown by 901, the portion corresponding to the fixed segment 900 is deleted, and the two cuts "Cut 1" and "Cut 2" are generated (i.e., the moving image is divided into two cuts). In the case where division is performed at the fixed segment 900, as shown by 902, the moving image is divided at the start position and the end position of the fixed segment 900, and the three cuts "Cut 1", "Cut 2", and "Cut 3" are generated (i.e., the moving image is divided into three cuts). Also, a configuration is possible in which tags indicating a playback segment are assigned to the start position and end position of the fixed segment 900, and only the fixed segment 900 is played back the next time the moving image is played back. In this case, unlike the cases of deleting and dividing, the original moving image data is maintained as is since only the assignment of tags is performed.

Figure 2B:
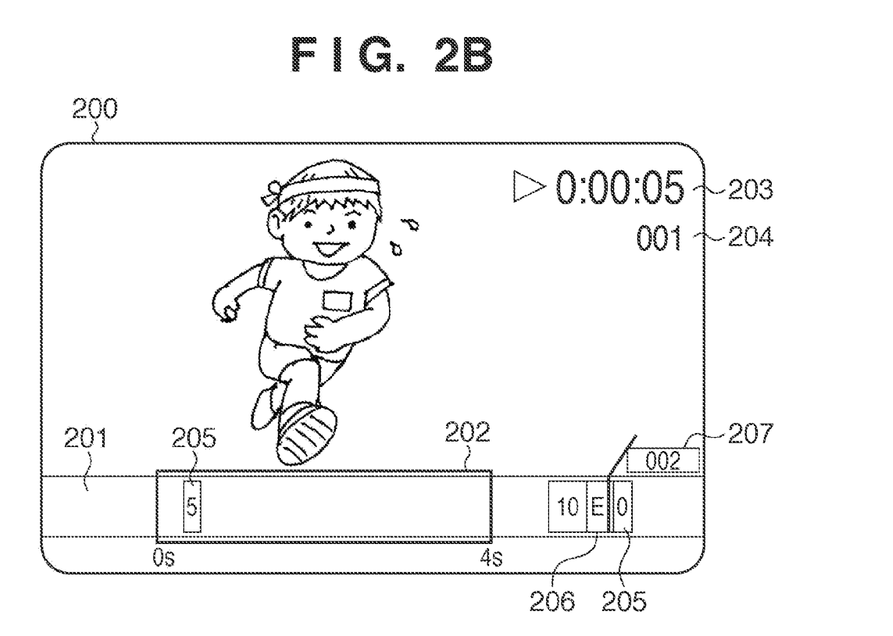

Also, although frame images and metadata are given as example of attribute information displayed in the time-series indicator region in Embodiments 1 and 2, "shooting time information" and "cut end information" may be displayed as attribute information in the time-series indicator region as shown in FIG. 2B. In the example shown in FIG. 2B, shooting time information 205 for a cut is displayed in the five-second units of "0s", "5s", and "10s", and also "E" is displayed as cut end information 206 at the end of a cut.

Also, in addition to the cut number 204 of the cut that is currently being played back, a cut number 207 ("002" in FIG. 2B) that indicates the cut to be played back next in succession may be displayed.

The cut number of the next cut may be displayed in Embodiments 1 and 2 as well.

In the case of playing back cuts in succession, it is possible to permit designating a fixed segment that spans a plurality of cuts, and it is possible to permit designating a fixed segment in only a single cut. In the case of permitting the designation of a segment in only a single cut, when the remaining time of the cut that is being played back becomes shorter than the fixed length, the segment length and the width of the segment indicator are thereafter reduced in conformity with the remaining time of the cut. The segment length that has been temporarily shortened in this way is reverted to the original setting value when the playback of that cut has ended, or when the playback of another cut has started.

Also, in Embodiments 1 and 2, frame images and metadata (icon images and pattern images) are displayed in a band-like manner in the time-series indicator region. However, there are no limitations to the display mode as long as it is possible to identify that the time-series indicator region is displayed in synchronization with the moving image that is being played back.

Figure 9:
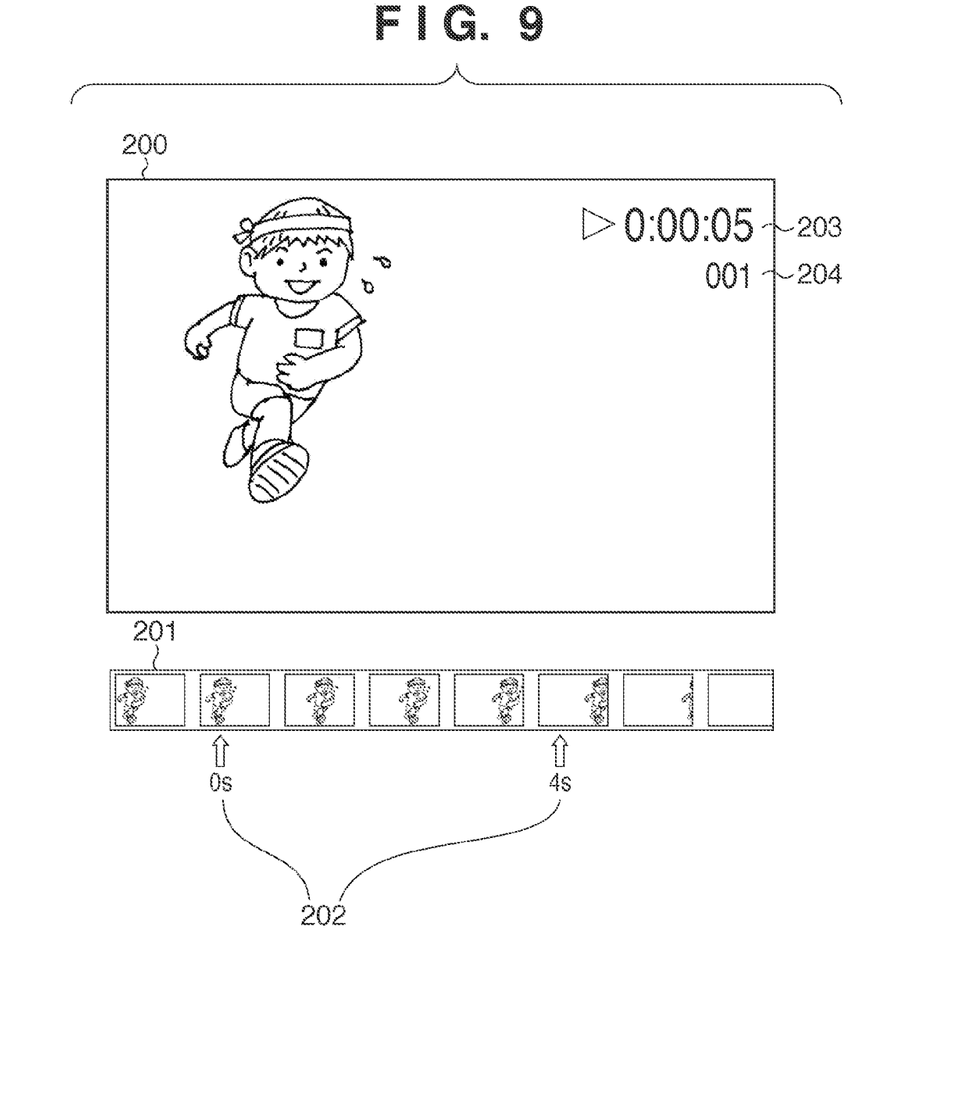
FIG. 9 is a diagram showing another example of a screen displayed during the playback of a moving image (playback screen) in a display controlling apparatus according to an embodiment of the present invention.

Also, although the example of a frame-shaped segment indicator is given in Embodiments 1 and 2, there are no limitations to the shape and display method as long as it is possible to identify the start position and the end position of the fixed segment based on a combination of the segment indicator and the attribute information displayed in the time-series indicator region. For example, a configuration is possible in which, as shown in FIG. 9, the segment indicator 202 is displayed with use of arrows that are associated with the time-series indicator region 201 so as to enable identifying the start position and the end position of the fixed segment. Also, as shown in FIG. 9, the playback screen 200 in which the frame at the current playback position is displayed as a moving image, as well as the time-series indicator region 201 and the segment indicator 202 do not necessarily need to be displayed in a state of being combined with each other, but rather may be respectively displayed in separate regions. It should be noted that the segment indicator 202 is displayed at a position associated with the time-series indicator region 201 and so as to enable identifying the start position and the end position of the fixed segment in the time-series indicator region 201.

Also, in Embodiments 1 and 2, the storage unit 104 used to store moving image data may be a removable recording medium such as a semiconductor memory card, or may be a recording medium such as a nonvolatile memory or a hard disk drive that is built into the display controlling apparatus.

Furthermore, the display controlling apparatus according to the present invention may include a function for shooting a moving image. In other words, the display controlling apparatus according to the present invention may be a device including a function for shooting a moving image, examples of which include a digital camera, a digital video camera, and a device including a camera function such as a mobile phone or a computer.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., non-transitory computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-043062, filed on Feb. 26, 2010, which is hereby incorporated by reference herein its entirety.

What is claimed is:

1. A display controlling apparatus comprising:
   a playback unit configured to play back a moving image;
   a display control unit configured to display a time-series indicator and a segment indicator in synchronization with playback of the moving image performed by the playback unit,
   wherein the time-series indicator displaying information regarding a plurality of frames in a first segment of the moving image being played back by the playback unit such that the information being arranged in chronological order with respect to the moving image, the first segment including a current playback position of the moving image, and
   wherein the segment indicator displaying, at respective positions in the time-series indicator, a start position and an end position of a second segment, the second segment having a fixed time length shorter than the first segment being included in the first segment, and furthermore including the current playback position; and
   a processing unit configured to, upon receipt of an instruction from a user during display performed by the display control unit, specify a position of the second segment in the moving image based on the time at which the instruction was received, and execute predetermined processing on data of the moving image included in the second segment at the specified position,
   wherein display position of the segment indicator moves relative to the time-series indicator in synchronization with playback of the moving image performed by the playback unit so that the segment indicator shows the current start and end positions of the second segment.

2. The display controlling apparatus according to claim 1, wherein the information regarding the plurality of frames of the moving image is still images generated from each of the plurality of frames.

3. The display controlling apparatus according to claim 1, wherein the information regarding the plurality of frames of the moving image is attribute information regarding each of the plurality of frames.

4. The display controlling apparatus according to claim 3, wherein the attribute information indicates at least one of whether camera-shake occurred during shooting, whether a face was detected during shooting, whether a zoom operation was performed during shooting, whether a panning operation was performed during shooting, whether audio was recorded, whether a back-lit state existed, whether a low/high contrast state existed, and whether an unawarely-captured state existed.

5. The display controlling apparatus according to claim 1, wherein the display control unit fixes a display position of the segment indicator, and updates the time-series indicator in synchronization with playback of the moving image.

6. The display controlling apparatus according to claim 1, wherein the display control unit performs updating so as to change a display position of the segment indicator in synchronization with playback of the moving image.

7. The display controlling apparatus according to claim 1, wherein the length of the second segment is selected in advance by the user from among a plurality of options.

8. The display controlling apparatus according to claim 1, wherein the length of the second segment is an arbitrary length set in advance by the user.

9. The display controlling apparatus according to claim 1, wherein the display control unit changes the width from the start position to the end position of the segment indicator in accordance with the speed at which the moving image is played back by the playback unit.

10. The display controlling apparatus according to claim 1, further comprising:
a reception unit configured to receive a designation of the length of the first segment from the user; and
a warning unit configured to issue a warning in a case where the designated length of the first segment is shorter than the length of the second segment.

11. The display controlling apparatus according to claim 1, wherein if the end of the moving image is included in the second segment at the time when the instruction was received, the processing unit specifies the position of the second segment in the moving image so as to be from a position indicated by the start position of the second segment to the end of the moving image.

12. The display controlling apparatus according to claim 1, wherein if the length of the moving image included in the second segment is less than a predetermined time, the processing unit does not execute the processing, regardless of whether the instruction exists.

13. A control method for a display controlling apparatus comprising the steps of:
playing back a moving image;
displaying a time-series indicator and a segment indicator in synchronization with playback of the moving image performed in the playback step,
wherein the time-series indicator displaying information regarding a plurality of frames in a first segment of the moving image being played back in the playback step such that the information being arranged in chronological order with respect to the moving image, the first segment including a current playback position of the moving image, and
wherein the segment indicator displaying, at respective positions in the time-series indicator, a start position and an end position of a second segment, the second segment having a fixed time length shorter than the first segment, being included in the first segment, and furthermore including the current playback position; and
specifying, upon receipt of an instruction from a user during display performed in the display control step, a position of the second segment in the moving image based on the time at which the instruction was received, and executing predetermined processing on data of the moving image included in the second segment at the specified position,
wherein display position of the segment indicator moves relative to the time-series indicator in synchronization with playback of the moving image performed by the playback unit so that the segment indicator shows the current start and end positions of the second segment.

14. A computer-readable non-transitory storage medium storing a program for causing a computer to function as the units of the display controlling apparatus according to claim 1.

* * * * *